(12) United States Patent
Liu et al.

(10) Patent No.: US 10,110,482 B2
(45) Date of Patent: Oct. 23, 2018

(54) TECHNIQUE FOR NETWORK SERVICE AVAILABILITY

(71) Applicant: Telefonaktiebolaget LM Ericsson (publ), Stockholm (SE)

(72) Inventors: Junhui Liu, Beijing (CN); Adrian Pan, Beijing (CN); Joe Sun, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 261 days.

(21) Appl. No.: 15/107,271

(22) PCT Filed: Dec. 23, 2013

(86) PCT No.: PCT/CN2013/090211
§ 371 (c)(1),
(2) Date: Jun. 22, 2016

(87) PCT Pub. No.: WO2015/095996
PCT Pub. Date: Jul. 2, 2015

(65) Prior Publication Data
US 2017/0005921 A1 Jan. 5, 2017

(51) Int. Cl.
*H04L 12/713* (2013.01)
*H04L 12/751* (2013.01)
(Continued)

(52) U.S. Cl.
CPC ........ *H04L 45/586* (2013.01); *H04L 41/0654* (2013.01); *H04L 41/0668* (2013.01);
(Continued)

(58) Field of Classification Search
CPC ....... H04L 45/586; H04L 45/64; H04L 45/66; H04L 45/74; H04L 45/02; H04L 41/0668; H04L 41/0654; H04L 45/22; H04L 45/28
See application file for complete search history.

(56) References Cited

U.S. PATENT DOCUMENTS

2008/0112311 A1 5/2008 Hariharan et al.
2014/0254352 A1* 9/2014 Natarajan ............... H04L 45/28
370/228

(Continued)

FOREIGN PATENT DOCUMENTS

| CN | 101958938 A | 1/2011 |
| CN | 102916897 A | 2/2013 |
| KR | 10-1266041 B1 | 5/2013 |

OTHER PUBLICATIONS

International Search Report, Application No. PCT/CN2013/090211, dated Sep. 30, 2014.
Cisco Systems, Inc., "ITU-T G.8032 Ethernet Ring Protection Switching", *Carrier Ethernet Configuration Guide, Cisco IOS XE Release 3S*, 2015, 24 pp.

(Continued)

*Primary Examiner* — Kwang B Yao
*Assistant Examiner* — Moo Ryong Jeong
(74) *Attorney, Agent, or Firm* — Sage Patent Group (57) ABSTRACT

A technique for triggering an association between a Media Access Control (MAC) address and a switch port is provided. The association allows forwarding data frames including the MAC address as destination MAC address via the associated switch port. Related methods include receiving a data frame originating from a node. The data frame includes a MAC address of the originating note as source MAC address. The data frame is stored including the MAC address. The data frame is successfully sent towards a first switch port. In response to a failure of a first link towards the first switch port, the stored data frame is resent towards a seconds switch port that is different from the first switch port for triggering the association between the second switch port and the MAC address of the originating node.

20 Claims, 7 Drawing Sheets

(51) Int. Cl.
*H04L 12/24* (2006.01)
*H04L 12/707* (2013.01)
*H04L 12/703* (2013.01)
*H04L 12/715* (2013.01)
*H04L 12/741* (2013.01)
*H04L 12/721* (2013.01)

(52) U.S. Cl.
CPC .............. *H04L 45/02* (2013.01); *H04L 45/22* (2013.01); *H04L 45/28* (2013.01); *H04L 45/64* (2013.01); *H04L 45/66* (2013.01); *H04L 45/74* (2013.01)

(56) References Cited

U.S. PATENT DOCUMENTS

2014/0294010 A1* 10/2014 Biswas ................ H04L 45/245
370/392
2015/0117179 A1* 4/2015 Sato ....................... H04L 45/28
370/219

OTHER PUBLICATIONS

Hinden et al., "Virtual Router Redundancy Protocol (VRRP)", Network Working Group, Request for Comments: 3768, Category: Standards Track, Apr. 2004, 27 pp.

* cited by examiner

TECHNIQUE FOR NETWORK SERVICE AVAILABILITY

CROSS REFERENCE TO RELATED APPLICATION

This application is a 35 U.S.C. § 371 national stage application of PCT International Application No. PCT/CN2013/090211, filed on Dec. 23, 2013, the disclosure and content of which is incorporated by reference herein in its entirety. The above-reference PCT International Application was published in the English language as International Publication No. WO 2015/095996 A1 on Jul. 2, 2015.

TECHNICAL FIELD

The present disclosure generally relates to a technique for providing network services. In particular, and without limitation, the disclosure relates to a device and a method for providing network services at a certain Quality of Service.

BACKGROUND

In order to achieve high availability of network services, alternative links between the network components provide backup path. For example, offering a network access to a plurality of hosts using protocols at any one of the layers 3 to 7 of the Open Systems Interconnection (OSI) model is conventionally implemented using a protection mechanism on layer 2 of the OSI model, which provides the alternative links or backup paths. Such protection mechanisms include Ethernet Ring Protection (ERP), Link Aggregation (LAG), Spanning Tree Protocol (STP), Multi-Protocol Label Switching Transport Profile (MPLS-TP), etc.

When a link failure is detected in the network, data traffic previously traversing the failed link has to be rerouted immediately using the alternative one or more links forming the backup path and avoiding the failed link. The protection mechanism may be triggered by deleting entries in a table associating Medium Access Control (MAC) addresses and switch ports. Entries that relate to MAC addresses and/or switch ports potentially affected by the link failure are deleted. Some of the protection mechanisms, e.g., ERP, LAG or MPLS-TP, complete all operations for rerouting the data traffic to the backup path in a very short time, e.g., within 50 ms or less. Hence, the network service provided to the host fulfills a certain Quality of Service (QoS) requirement. For example, the QoS requirement may specify that glitch is less than 50 ms for a network service providing an audio conversation.

However, the deleted MAC entries are relearned not until a data frame including the corresponding source MAC address is received by switches along the backup path. As long as no corresponding entry exists for a data frame to be forwarded at a switch, the switch floods the data frame, i.e., the data frame is sent at all of its switch ports except for the switch port at which the data frame was received. Consequently, unnecessary flooding consumes network bandwidth. Furthermore, some network components may set a limit, e.g. 10% of the total bandwidth, for flooded data traffic. Consequently, the QoS may be compromised before the corresponding MAC address is relearned, e.g., even in the presence of fast protection switching mechanisms.

SUMMARY

Accordingly, there is a need for a technique that improves network service availability in at least certain situations.

According to one aspect, a method of triggering an association between a Media Access Control (MAC) address and a switch port is provided. The association allows data frames including the MAC address as destination MAC address to be forwarded via the associated switch port. The method comprises a step of receiving a data frame originating from a node, wherein the data frame includes the MAC address of the originating node as source MAC address; a step of storing the data frame including the MAC address; a step of successfully sending the data frame towards a first switch port; and a step of resending, in response to a failure of a first link towards the first switch port, the stored data frame towards a second switch port that is different from the first switch port for triggering the association between the second switch port and the MAC address of the originating node.

According to another aspect, a computer program product is provided. The computer program product comprises program code portions for performing the steps of any one of the methods disclosed herein when the computer program product is executed by a computing device.

As to a hardware aspect, a device for triggering an association between a Media Access Control (MAC) address and a switch port is provided. The association allows data frames including the MAC address as destination MAC address to be forwarded via the associated switch port. The device comprises: a receiving unit adapted to receive a data frame originating from a node, wherein the data frame includes the MAC address of the originating node as source MAC address; a storing unit adapted to store the data frame including the MAC address; and a sending unit adapted to send the data frame towards a first switch port and to resent after successfully sending the data frame towards the first switch port, in response to a failure of a first link towards the first switch port, the stored data frame towards a second switch port that is different from the first switch port for triggering the association between the second switch port and the MAC address of the originating node.

BRIEF DESCRIPTION OF THE DRAWINGS

In the following, the present disclosure is described in more detail with reference to exemplary embodiments illustrated in the drawings, wherein.

DETAILED DESCRIPTION

In the following description, for purposes of explanation and not limitation, specific details are set forth such as a specific device and system configurations and specific method steps and functions, in order to provide a thorough understanding of the technique presented herein. The skilled person appreciates that the technique may also be practiced in other embodiments that depart from these specific details.

Those skilled in the art further appreciate that the method steps and functions described herein may be implemented using individual circuitry, using software functioning in conjunction with a programmed microprocessor or general purpose computer, using one or more Application Specific Integrated Circuits (ASICs), one or more Digital Signal Processors (DSPs) and/or one or more Field Programmable Gate Arrays (FPGAs). It is also appreciated that the technique disclosed herein may be embodied in a processor and a memory coupled to the processor, wherein the memory stores one or more programs that perform the method steps and functions described herein when executed by the processor.

According to one aspect, a method of triggering an association between a Media Access Control (MAC) address and a switch port is provided. The association allows data frames including the MAC address as destination MAC address to be forwarded via the associated switch port. The method comprises a step of receiving a data frame originating from a node, wherein the data frame includes the MAC address of the originating node as source MAC address; a step of storing the data frame including the MAC address; a step of successfully sending the data frame towards a first switch port; and a step of resending, in response to a failure of a first link towards the first switch port, the stored data frame towards a second switch port that is different from the first switch port for triggering the association between the second switch port and the MAC address of the originating node.

The first and/or the second switch port may relate to switch ports of one or more nodes different from a triggering node performing at least some of above method steps. E.g., the first switch port may be located at a first node receiving at least the successfully sent data frame. The second switch port may be located at a second node receiving at least the resent data frame. The first node and the second node may be identical nodes including both the first and the second switch port. At least one of sending and resending may use a broadcast or multicast MAC address as the destination MAC address.

"Successfully" sending the data frame may encompass that the data frame is sent by the triggering node before the occurrence of the link failure. Alternatively or in addition, "successfully" sending the data frame towards the first switch port may encompass that the data frame traverses at least one link, reaches at least a next device (e.g., in the data link topology) towards the first switch port or a next hop towards the first switch port. As a further alternative or in addition, "successfully" sending the data frame towards the first switch port may encompass that the data frame reaches the first switch port.

The "failure" of a link, e.g., the first link, may encompass a change in a status (e.g., a connectivity status) of the link and/or a node (e.g., a switch) at an end point of the link. For example, the status may change from a connected status to a disconnected status. As another example, the status may change from a nominal transmission rate to a transmission rate that is lower than the nominal transmission rate, e.g., less than 10% of the nominal transmission rate or equal to zero. Alternatively or in addition, the "failure" of the link may relate to a situation during which no data frames are exchangeable via the link. Furthermore, the failure may be caused by a failure of a physical transport medium used by the link (e.g., a broken line or a blocked radio connection). Still further, the failure may be caused by a failure of a node at an endpoint of the link (e.g., a switch).

The data frame including the MAC address of the originating node may be periodically received from the originating node. A duration between the periodic receptions may be on the order of 1 second, 2 seconds or more.

Storing the received data frame may replace a previously received data frame, e.g., a previously stored data frame that includes the same MAC address as the source MAC address. The data frame may be stored incompletely, e.g., a data field including payload data may be discarded. Alternatively, one or more data fields of the received data frame may be stored. The step of resending may further include a substep of generating a data frame based on the stored one or more data fields. Generating a data frame using a variable MAC address as source MAC address may also be referred to as data frame spoofing.

The method may further comprise a step of forwarding second data frames received via the first or second switch ports to the originating node. A rate of the second data frames forwarded to the originating node may be greater than, e.g., at least 10-times greater than, a rate of the received data frames originating from the originating node.

At least one of the steps of forwarding, storing, sending and resending may be performed by one or more triggering nodes located in a transport network. The transport network may include, or may be included in, a telecommunications network. The triggering node may be located between the originating node and the first switch port. Furthermore, the triggering node may be located between the originating node and the second switch port.

The triggering node may be topologically located between the originating node and each of the first and the second switch ports. E.g., the triggering node may be arranged between the originating node and one or more switches that include the first switch port and/or the second switch port.

Within the transport network, the triggering node may be topologically closest to the originating node, e.g., on the data link layer. E.g., among nodes within the transport network and adapted to forward data frames based on a destination MAC address included in the data frame, the triggering nodes may be the node that is topologically closest to the originating node. On the physical layer, the triggering node may be indirectly connected to the originating node. E.g., one or more nodes that are not capable of switching data traffic may be connected between the triggering node and the originating node.

The triggering node may be a head-end node of the transport network. The transport network may be an overlay network on the data link layer. The transport network may include a protection mechanism on the data link layer. The protection mechanism may include the different first and second switch ports. E.g., the protection mechanism may include a primary path including the first switch port and a backup path including the second switch ports. The protection mechanism may include one or more of Ethernet Ring Protection (ERP), Link Aggregation (LAG), Spanning Tree Protocol (STP) and Multi-Protocol Label Switching Transport Profile (MPLS-TP).

The triggering node may directly or indirectly connect the overlay network to the originating node. The overlay network may be a Virtual Local Area Network (VLAN). The VLAN may provide Internet access to a plurality of spatially distributed hosts.

The triggering node may include a first local port coupled to the first network switch and/or a second local port coupled to the second switch port. The step of resending may further include cancelling, e.g., in a local MAC address table stored at the triggering node, one or more entries indicating the first local port.

The data frame may be resent towards one or more second switch ports of one or more switches each including one of the second switch ports. The reception of the resent data frame at the one or more switches may trigger storing the association between the corresponding one second switch port and the MAC address of the originating node. The association may be locally stored at each of the one or more switches.

The resent data frame may be received at one or more switches. Each switch may have a plurality of switch ports, e.g., including the first switch port and/or the second switch port. The link failure may cause one or more of the switches to flush (e.g., delete) its MAC address table. Receiving the resent data frame may trigger storing the association between the second switch port and the MAC address of the originating node. The association may be stored in one or more of the switches. The one or more switches may be different from the triggering node.

The term switch as used herein may also encompass a bridge or any node adapted to forward data frames depending on a MAC address included in the data frame as destination MAC address.

A first link and a second link may be coupled to the first switch port and the second switch port, respectively. Prior to the failure, the data frame may be successfully forwarded towards the first switch port via the first link. The triggering node may detect the link failure. The stored data frame may be resent via at least the second link towards the second switch port in response to detecting the failure of the first link. The second link may be different from the first link. The resending may triggering the association based on the source MAC address.

The association may allow, e.g. at the first and/or second nodes, forwarding data frames including the MAC address as destination MAC address by sending the data frame via the associated switch port in a first direction towards the originating node. Sending and resending, e.g. at the triggering node, the data frame originating from the originating node relates to a second direction that is opposite to the first direction. Data frames received at any one of the switches in the transport network in the first direction and for which no association is stored may be flooded via all switch ports other than the switch port through which the data frame was received.

The data frame may be stored at the triggering node for a time after sending the data frame for the first time. The received data frame may be selectively stored depending on a field value included in the data frame.

A list of MAC addresses may be provided. The list may indicate prioritized or critical network components, e.g., gateways. Optionally, only data frames that include a source MAC address also included in the list are stored. The stored data frames and/or data frames generated based on the stored data frames may be resent in response to the failure of the first link. Alternatively or in addition, each of the data frames resent responsive to the failure may include one of the MAC addresses in the list as the source MAC address.

The data frame may be stored in its entire length. The data frame may be stored without processing the received data frame. The data frame may be stored as received from the originating node.

The originating node may be a virtual router or a currently active router according to a Virtual Router Redundancy Protocol (VRRP). The data frame originating from the originating node may include a VRRP message.

Alternatively or in combination, the data frame originating from the originating node may include an Address Resolution Protocol (ARP) message. The data frame including the ARP message may be stored without performing an ARP analysis of the data frame. The ARP message may include an ARP reply to an ARP request and/or an ARP announcement. The ARP announcement may indicate a change in the MAC address of the originating node, e.g., when the active VRRP router has changed to a previous backup VRRP router.

According to another aspect, a computer program product is provided. The computer program product comprises program code portions for performing the steps of any one of above methods when the computer program product is executed by a computing device. The computer program product may be stored on a computer-readable recording medium.

As to a hardware aspect, a device for triggering an association between a Media Access Control (MAC) address and a switch port is provided. The association allows data frames including the MAC address as destination MAC address to be forwarded via the associated switch port. The device comprises: a receiving unit adapted to receive a data frame originating from a node, wherein the data frame includes the MAC address of the originating node as source MAC address; a storing unit adapted to store the data frame including the MAC address; and a sending unit adapted to send the data frame towards a first switch port and to resent after successfully sending the data frame towards the first switch port, in response to a failure of a first link towards the first switch port, the stored data frame towards a second switch port that is different from the first switch port for triggering the association between the second switch port and the MAC address of the originating node.

The device may further be adapted to perform any one of above method steps. The device may be implemented in the triggering node.

With respect to the following embodiments, the same reference numerals are used to denote the same or corresponding components.

Figure 1:
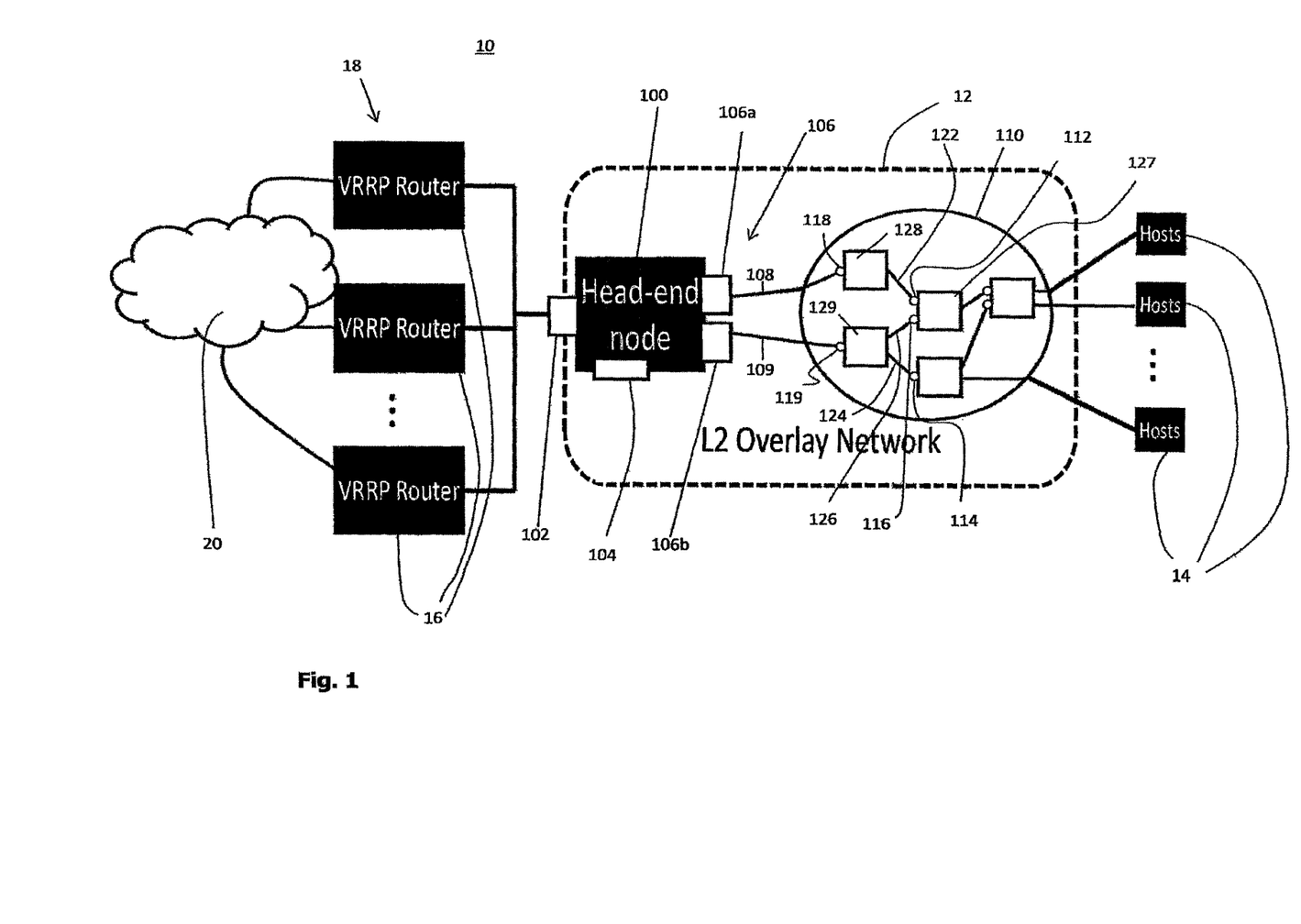
FIG. 1 schematically illustrates an exemplary network environment for an embodiment of a device for triggering an association between MAC address and switch port.

FIG. 1 schematically illustrates a network environment 10 including a transport network 12. The transport network 12 provides transport services to a plurality of hosts 14. One or more routers 16 connected to the transport network 12 to a network 20. The network 20 may be a public network or a proprietary network. Alternatively or in combination, the network 20 may be a backbone network, e.g., dedicated to telecommunication services or for data services in general. For example, the network 20 may be the Internet. For clearness without limitation, the example of the Internet 20 is described in what follows.

The transport network 12 is operated in an overlay mode. The functionality of the transport network 12 on a data link layer (e.g., layer 2 of the OSI model) is transparent to the hosts 14. That is, customers of a network provider operating the transport network 12 do not have and/or do not require any knowledge of the data link structure or the physical network topology of the transport network 12. For example, the transport network 12 includes a protection mechanism and/or redundancy mechanisms for high availability of the transport services. These mechanisms are invisible to the operation of the hosts 14 at a network layer (e.g., layer 3 or higher layers of the OSI model).

For example, the transport network 12 does not require any handling specific to the transport network 12 at the sided of the hosts 14 in the network layer protocols or protocols of higher layers. The transport network 12 fulfills a Quality of Service (QoS) requirements, e.g., as to availability and jitter, depending on client or server applications executed by the hosts 14. The topology of the data link layer and the configuration of the data link layer take all service scenarios of the hosts 14 at the network layer into account.

In the exemplary network environment 10 shown in FIG. 1, the routers 16 form a group of routers 16 in the same Local Area Network (LAN). The group of routers 16 acts as one gateway router 18 according to the Virtual Redundant Router Protocol (VRRP). The VRRP is a protocol to provide high availability of gateway routers. The VRRP specifies an election protocol so that only one of the plurality of routers 16 is an active router at any point in time. Furthermore, the VRRP specifies a virtual MAC address of the gateway router. Only the active router forwards data frames using the virtual MAC address as destination MAC address.

The VRRP provides a redundancy mechanism on the network layer. In case of failure of the active router, a new active router is elected and starts forwarding the data frames having the virtual destination MAC address. In this way, the hosts 14 connected to the virtual gateway 18 via the transport network 12 are not affected as long as at least one of the VRRP routers 16 is functioning.

For data traffic forwarded from the Internet 20 towards the transport network 12, the active VRRP router typically uses its (e.g., physical) port MAC address as source MAC address, and not the virtual MAC address according to the VRRP. As is pointed out in chapter 2.4 of document Request for Comments (RFC) 3768, "Virtual Router Redundancy Protocol (VRRP)" from April 2004, if the virtual router MAC address is never used as the source MAC address in a data frame (which is also referred to as a "link level frame"), then the station location is never learned in the transport network 12 operated as a multi-access LAN. As long as the association between MAC address and switch board is not learned by the network components 110 in the transport network 12, all data frames sent in the opposite direction from the hosts 14 via the transport network 12 towards the virtual router 18 are flooded within the transport network 12.

Therefore, the VRRP router 18 periodically sends data frames including the virtual VRRP MAC address as the MAC source address towards the transport network 12. Chapter 5.3.7 of RFC 3768 specifies a default interval (also referred to as Advertisement Interval) of 1 second for periodically sending these data frames.

The network environment 10 described with reference to FIG. 1 is an example of an asymmetric data traffic pattern regarding to the MAC addresses used for the data traffic. The asymmetric data traffic pattern affects the convergence speed of MAC learning and relearning within the transport network 12.

The transport network 12 includes a device 100 for triggering an association between a MAC address and a switch port at one or more network components 110 adapted to store the association. The device 100 is topologically, e.g., on the data link layer and/or on the physical layer, arranged between an originating node 18 and the further network components 110 of the transport network 12. Due to its topological position, the device 100 is also referred to as a head-end node of the transport network 12.

The device 100 includes a receiving unit 102 directly or indirectly connected to the originating node 18, a storing unit added to that to store one or more data frames received from the originating node 18 and a sending unit 106 adapted to send data frames via one or more data links 108, 109 towards the network components 110.

The one or more network components 110 include at least one first switch port and at least one second switch port. The first and second switch ports may be implemented at distinct nodes, such as the switch ports 112 and 114. Alternatively or in addition, the first and second switch ports may be implemented at the same node of the transport network 12, such as the switch ports 112 and 116 at switch 127. As a still further alternative or in addition, at least one first switch port and/or at least one second switch port can be directly connected via one link in each case to the device 100. For example, switch ports 118 and 119 connect switches 128 and 129, respectively, via the links 108 and 109, respectively, to the device 100.

The first switch port is part of a bidirectional primary path for transporting data between the originating node 18 and at least one host 14 via the device 100. The second switch port is part of a bidirectional backup path for transporting data between the originating node 18 and at least one host 14 via the device 100. In response to a failure of a first link, e.g., link 122, on the primary path, the data is routed via the backup path. The failed first link can be any one of the links along the primary path in the transport network 12 and is not limited to a link directly connected to the first switch port and/or the device 100. Furthermore, the link failure may be due to any one of the network components 110 maintaining the failed link, e.g., the switch 127 or 128 maintaining the link 122.

Figure 2:
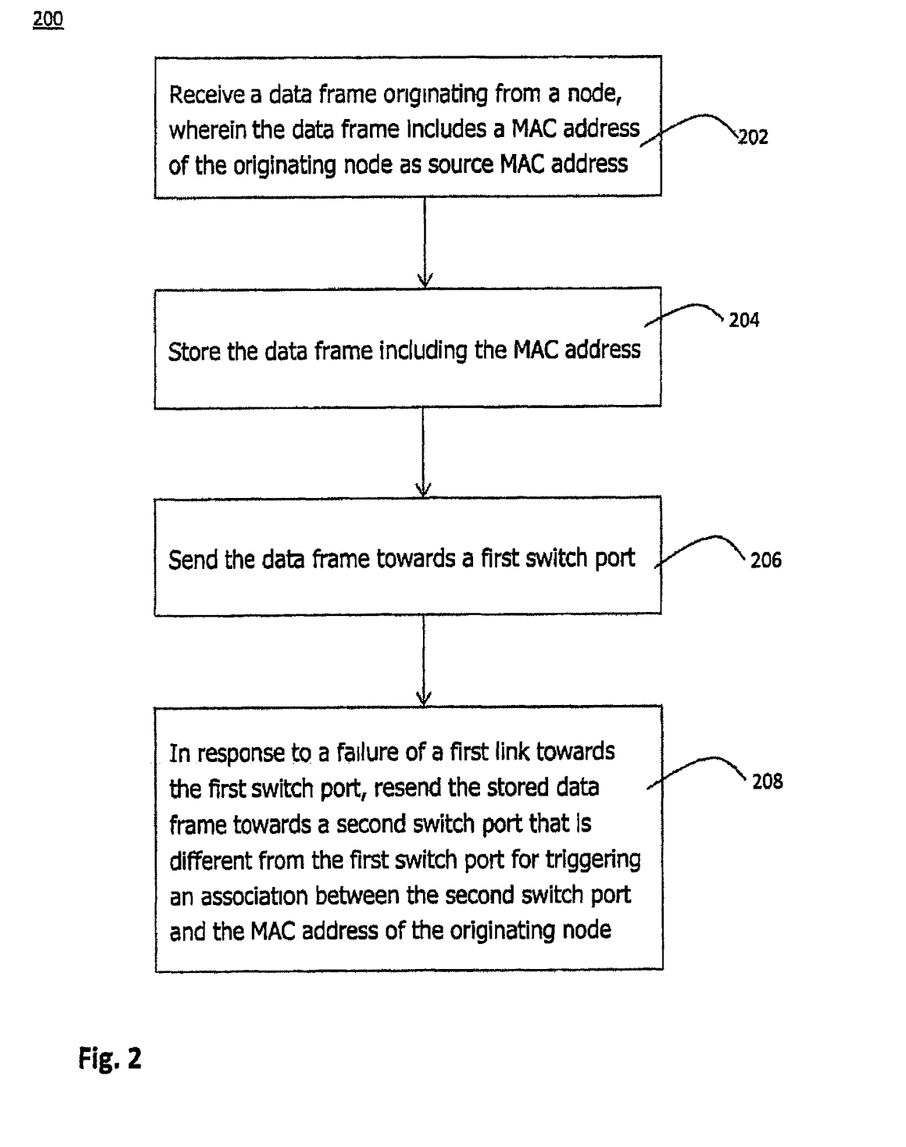
FIG. 2 shows a flowchart of a method of triggering an association between a MAC address and a switch port that can be performed by the device of FIG. 1.

FIG. 2 shows a flowchart of a method 200 of triggering an association between a MAC address and a switch port. The association allows forwarding data frames including the MAC address as destination MAC address via the associated switch port. The method may be implemented by the device 100. In a step 202, a data frame originating from a node, e.g., the originating node 18, is received. The received data frame includes a MAC address of the originating node 18 as source MAC address.

In a step 204 of the method 200, the received data frame including the MAC address is stored prior to or after sending the data frame towards one or more first switch port in a step 206. The step 204 may be part of a forwarding functionality for forwarding data frames on the data link layer.

In response to the failure of a first link towards the first switch port, the stored data frame is resent towards at least one second switch port for triggering the association between the second switch port and the MAC address of the originating node 18 in a step 208.

The method 200 may be performed by the device 100, e.g., in the network environment 10. The steps 202 and 204 of the method 200 can be implemented by the units 102 and 104 of the device 100, respectively. The steps 206 and 208 can be implemented by the unit 106. Alternatively, dedicated subunits 106a and 106b of the device 100 may implement the step 206 of sending and the step 208 of resending, respectively.

Figure 3:
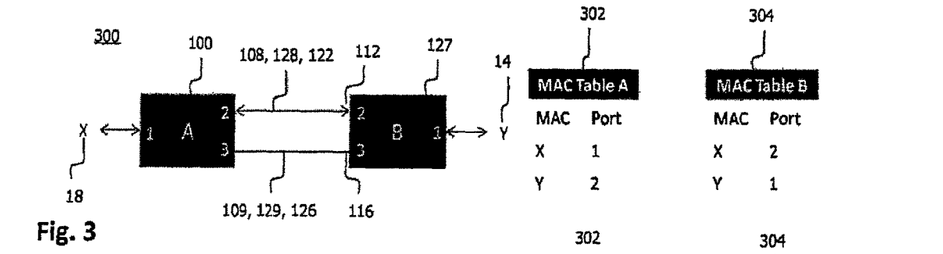
FIGS. 3 to 5 schematically illustrate MAC relearning triggered by the device of FIG. 1 and the method of FIG. 2.
Figure 4:
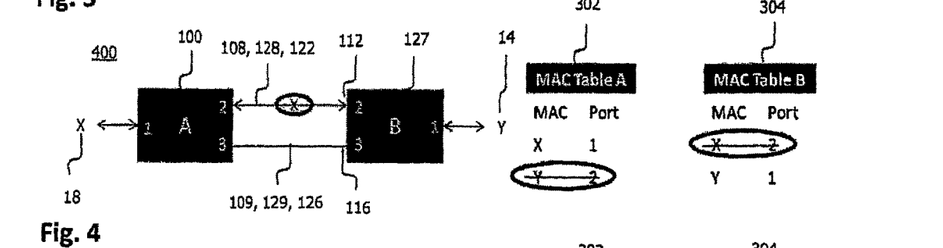
Figure 5:
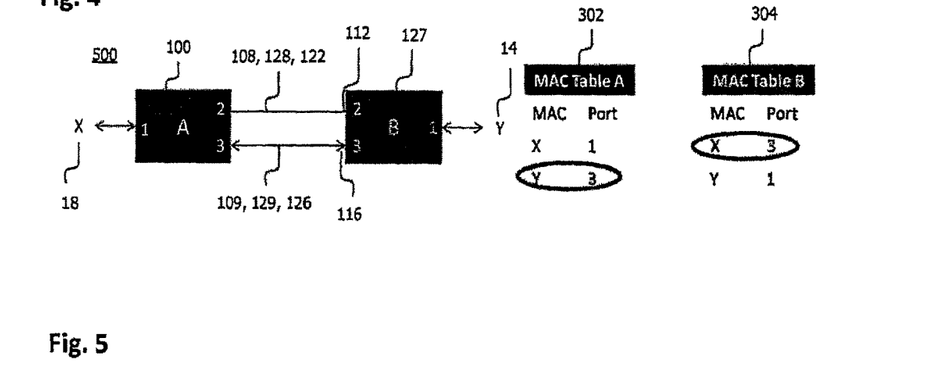

The triggering caused by at least some implementations of the method 200 performed by the device 100 is described with reference to FIGS. 3 to 5. The association may be triggered in any one of the network components 110, e.g., the node 127. Storing the association between MAC address and switch port is also referred to as MAC learning. Updating the association is also referred to as MAC relearning. For simplicity, any network component of the transport network 12 adapted to update the association is referred to as a switch, which may include, e.g., a bridge. MAC learning may be implemented according to the standard document IEEE 802.1Q, e.g., for Virtual Local Area Networks (VLANs) and/or standard document IEEE 802.1ad, e.g., for stacked VLANs.

MAC learning relates to a process of obtaining an association between the MAC address of a device connected to the switch and the switch port of the switch via which the device is connected to the switch. When a data frame reaches into the switch port of the switch, the switch reads the MAC address from a source MAC address field included in the data frame and compares the source MAC address to a MAC address table stored in the switch. FIG. 3 schematically illustrates the device 100 and the device 127 as well as their MAC address tables 302 and 304, respectively.

The MAC address table 304 includes a column (shown on the left-hand side) indicating the MAC address and a column (shown on the right-hand side) indicating the switch port associated with the MAC address. The MAC address table 304 is stored within the switch 127. The situation 300 illustrated in FIG. 3 is prior to the link failure, i.e., the first switch port 112 (denoted by "2") of the primary path segment 108-128-122 is included in the MAC address table 304.

MAC learning and MAC relearning is based on the source MAC address included in data frames received at the switch 127. If the switch 127 cannot find an entry in the MAC address table 304 including the received source MAC address, the switch 127 adds a new entry in the MAC address table 304 including the retrieved source MAC address in association with the switch port via which the data frame including the source MAC address was received.

The stored entries, i.e., the associations between MAC address and switch port, are used by the switch 127 for avoiding unnecessary data traffic in network branches not including the node identified by a destination MAC address included in another data frame to be forwarded. That is, using the MAC address table 304 is based on the destination MAC address included in data frames received at the switch 127. If the switch 127, e.g., a bridge according to IEEE 802.1Q, receives a data frame including as the destination MAC address a unicast MAC address that is not known from the MAC address table 304, the switch 127 floods the data frame, i.e., the data frame is sent out at all switch ports of the switch 127 except for the port via which the data frame was received. Clearly, flooding a unicast data frame causes unnecessary data traffic in those networks branches that do not include the destination node. Flooding thus consumes network bandwidth and should be minimized.

Since the switch 127 learns the association based on the source MAC address of the data frame received from the device 100 and uses the learned association to avoid the flooding of data frames forwarded in the reverse direction, i.e., data frames destinated to the learned MAC address, MAC learning and MAC relearning relies on bidirectional data traffic to be effective. If a MAC address is never received at the switch 127 as a source MAC address, the switch 127 will not insert the MAC address in the MAC address table 304, so that data frames destinated to this MAC address will be flooded. Unidirectional data traffic at the switch 127 will be flooded. For asymmetric data traffic at the switch 127, the time for MAC relearning is dominated by the rare communication direction. The data traffic destinated to the VRRP virtual router 18 in the exemplary network environment 10 shown in FIG. 1 is an example for asymmetric data traffic.

As a consequence, the time for MAC relearning at the switch 127 after a link failure is determined by the periodicity at which the rare date traffic originating from the VRRP virtual router 18 towards the hosts 14 is sent. When the primary path fails, some protection mechanisms may allow rapidly detecting the link failure in the primary path and the corresponding entries in the MAC address table 304 are removed, as is schematically illustrated in situation 400 in FIG. 4 for the primary path including the network components 108, 128 and 122.

At this point, the device 100 has the received in the step 202 the data frame including the virtual MAC address of the VRRP gateway 18 (as an example of the originating node) and has stored the data frame including the virtual MAC address according to the step 204 of the method 200. Even though the data frame has been successfully sent towards the first switch port 112 in the step 206 in the situation 300, in response to detecting the link failure, the device 100 resends the data frame including the virtual MAC address of the VRRP gateway 18 towards the second switch port 116 in the step 208 of the method 200. As a result, the switch 127 including the second switch port 116 immediately relearns the association between the virtual MAC address included in the resent data frame and the second switch port 116 via which the resent data frame is received. FIG. 5 schematically illustrates the resulting situation 500 after MAC relearning triggered by the resending step 208. The association is stored in the local MAC address table 304. The MAC address (denoted by "X") of the originating node 18 is thus associated with the second switch port 116 (denoted by "3") on the backup path segment 109-129-126.

While MAC relearning triggered by the method 200 has been exemplarily described with reference to FIGS. 3 to 5 for the switch 127 including both the first switch port 112 and the second switch port 116, the method 200 can also trigger MAC relearning for a first switch (e.g., the switch 128) including the first switch port (e.g., the switch port 118) and for a second switch that is different from the first switch and includes the second switch port (e.g., the switch 129 including the switch port 119). For instance, when the link 108 fails, the device 100 resends the stored data frame in the step 208. The resent data frame is received by the switch 129 at the switch port 119, so that the switch 129 adds an entry representing the association between the MAC address of the originating node 18 and the switch port 119 into its MAC address table.

As is indicated in each of the FIGS. 3 to 5, the device 100 may also update its MAC address table 302 by cancelling the entry corresponding to the failed link and relearning an association corresponding to the backup path, e.g., based on a later data frame that is received at the device 100 via the switch 127 and destinated to the originating node 18.

As a result of the association triggered by the method 200, the time for MAC relearning after a link failure is not determined by the periodicity at which a data frame including the MAC address of the originating node 18 is sent towards the network components 110. Rather, the MAC relearning time is decoupled from the rate at which data frames are sent from the originating node 18 towards the transport network 12. The device 100 immediately resends the stored data frame as soon as a protection mechanism has caused flushing of the MAC address table 304. A protection switching time including the MAC relearning convergence time can be on the order of 50 ms or less. In contrast, the VRRP protocol Announcement Interval can still be on the order of seconds, e.g., up to 240 seconds, during which a conventional network environment would experience flooding of data frames destinated towards the VRRP gateway 18.

Figure 6:
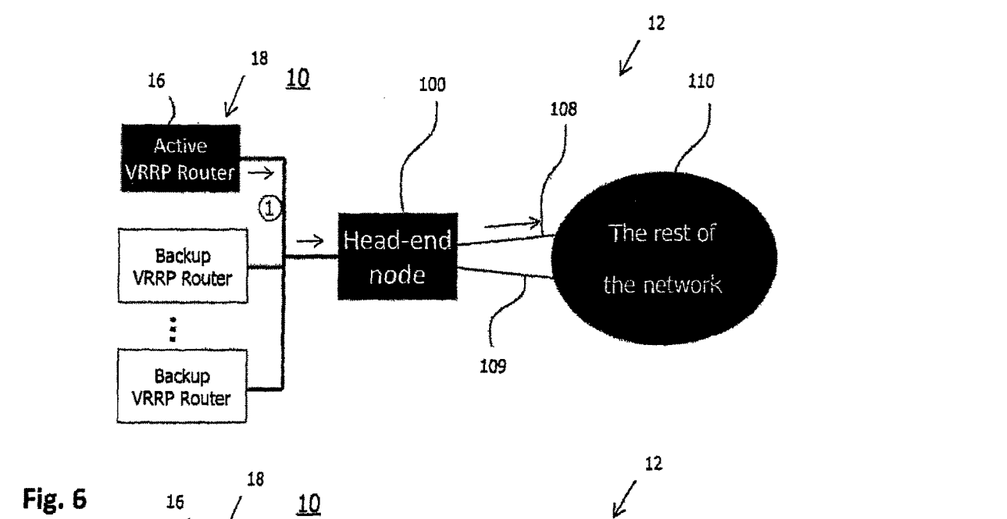
FIGS. 6 to 9 schematically illustrate steps of an implementation of the method of FIG. 2.

An implementation of the method 200 is described in more detail for a data frame originating from the originating node 18 according to the Address Resolution Protocol (ARP). When the VRRP router 16 becomes active, it begins sending VRRP data packets and also gratuitous ARP data packets, each of which is an example for the data frame originating from the originating node 18 and including the MAC address of the originating node as the source MAC address. FIG. 6 schematically illustrates the step 202 of receiving the data frame originating from the currently active VRRP router at the head-end node implementing the device 100 facing the VRRP router 16. Arrows pointing to the right indicate the data frame sent by the device 100 towards the one or more first switch ports of one or more of the network components 110 according to the step 206.

Figure 7:
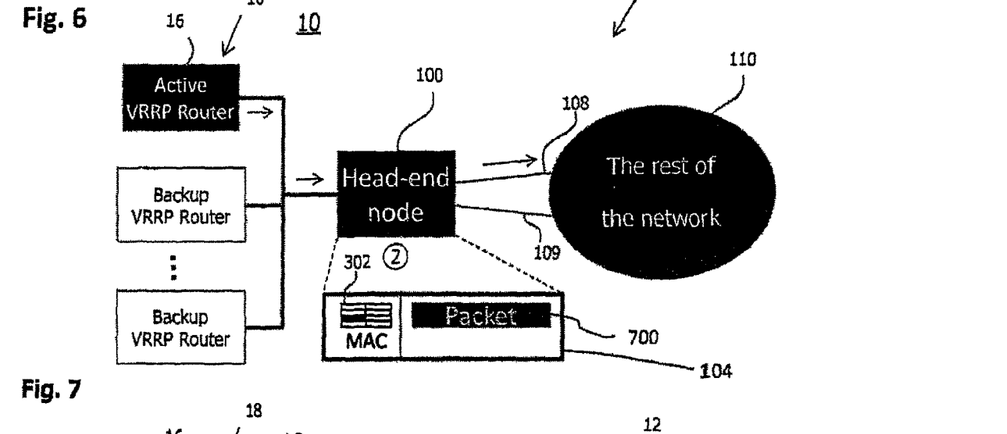

The head-end node 100 learns the virtual MAC address from the data frame and stores the data frame, which is schematically illustrated at reference sign 700. Storing the data frame according to the step 204 is also referred to as caching. In a variant of the method implementation, multiple copies are cached for higher reliability. Optionally, a time stamp is stored in association with the stored data frame 700. Upon exceeding a predefined time lag after the time indicated by the time stamp, the data frame 700 is deleted from the cache.

Figure 8:
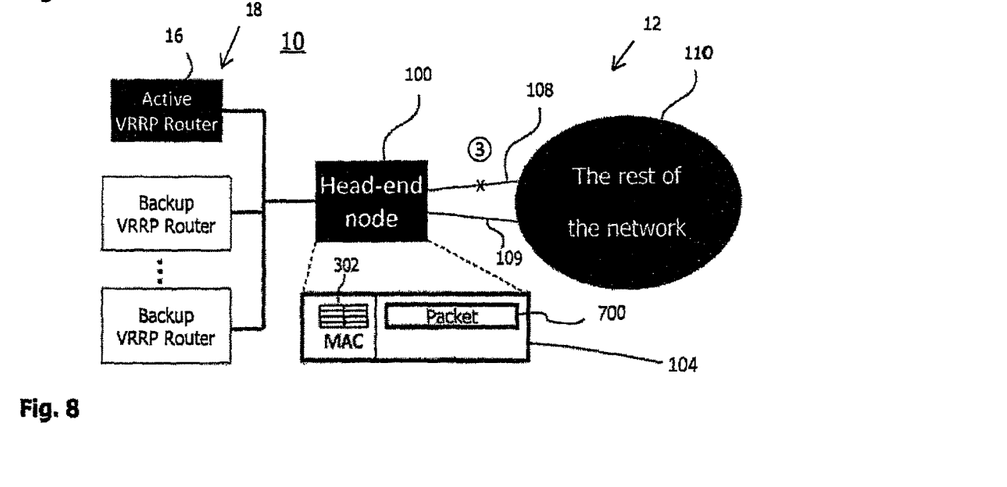
Figure 9:
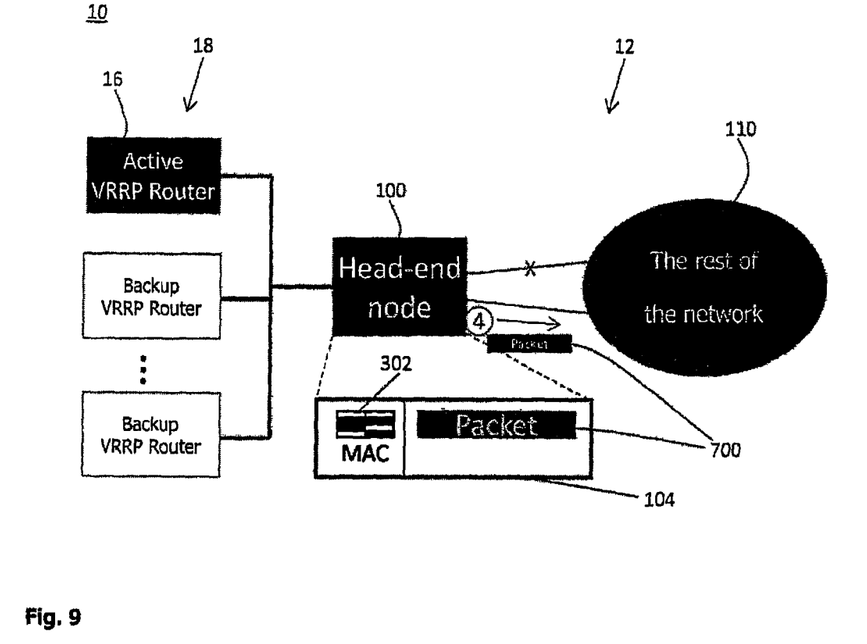

The device 100 detects any link failure in one of the links along the primary data path within the transport network 12. As is schematically illustrated in FIG. 8, a link failure, e.g., of the link 108, is detected by the device 100. The device 100 removes affected entries in the MAC address table 302. Furthermore, the device 100 resends the cached data frame 700 according to the step 208 towards the network components 110, as is schematically illustrated in FIG. 9. The device 100 preferably resends the stored data packet 700 at all ports other than the port through which the data frame was received from the originating node 18 in the step 202.

The stored data frame is indicated as aged and/or removed, optionally together with the learned MAC address entry in the MAC address table 302, to avoid adverse influence on the network components 110 caused by resending aged data frames.

While above embodiments and exemplary implementations have been described for a transport network 12 including a single node 100 implementing the method 200, any switch that receives and forwards data frames 700 from the originating node 18 (e.g., VRRP or ARP data packets) can implement the method 200, e.g., the nodes 127, 128 and/or 129 shown in FIG. 1. Furthermore, the device 100 does not have to be directly connected to the originating node 18, e.g., the VRRP routers 16. For example, logical adjacency (e.g., on the data link layer) of the node 100 implementing the method 200 and the originating node 18 is sufficient.

In an advanced embodiment, the received data frame 700 is selectively stored depending on a relevance assessment performed by the device 100 in the step 204 of the method 200. For example, some MAC addresses, such as a gateway MAC address or frequently accessed server MAC addresses, are more important than a MAC address of an ordinary host. The device 100 is set up including a list of important MAC addresses. The list of MAC addresses is used for selectively storing the data frame in the step 204 in a first advanced embodiment of the device 100. In a second advanced embodiment, the device 100 proactively sends stored data frames 700, e.g., ARP data packets, or spoofed data frames generated based on the stored data frames 700, for one or all of the MAC addresses included in the list. The device thus selectively accelerates MAC relearning in the transport network 12, e.g., so as to avoid or reduce flooding.

Figure 10:
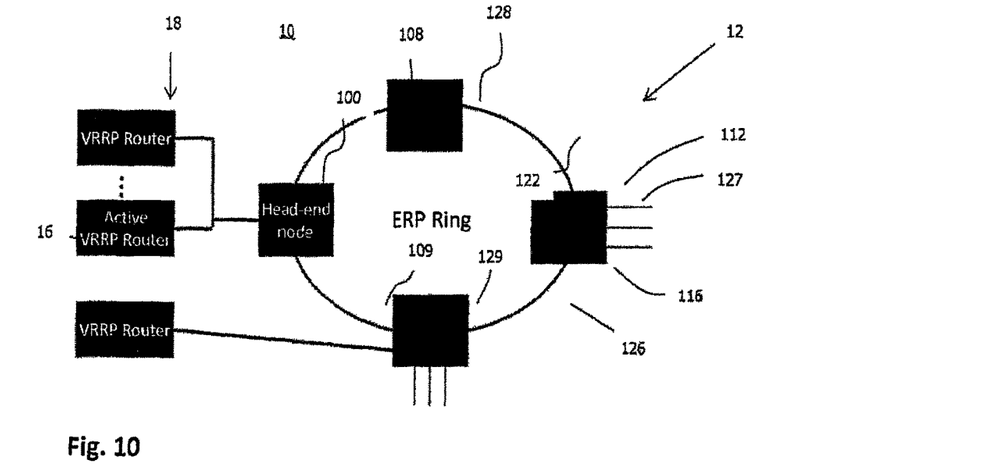
FIG. 10 schematically illustrates a first network environment including the device of FIG. 1.
Figure 11:
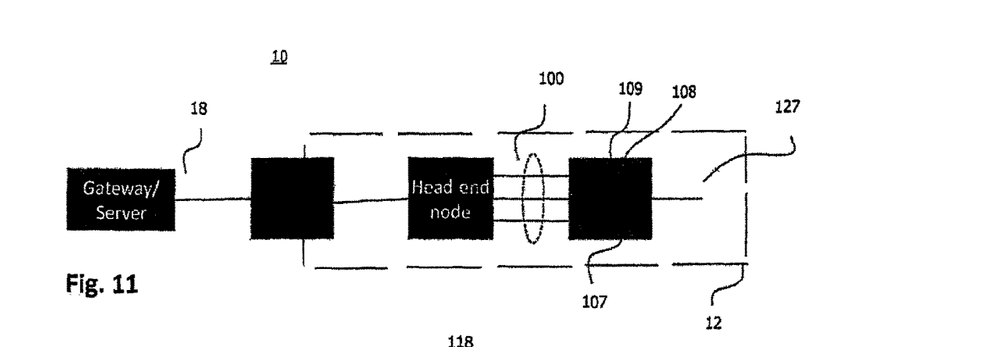
FIG. 11 schematically illustrates a second network environment including the device of FIG. 1.
Figure 12:
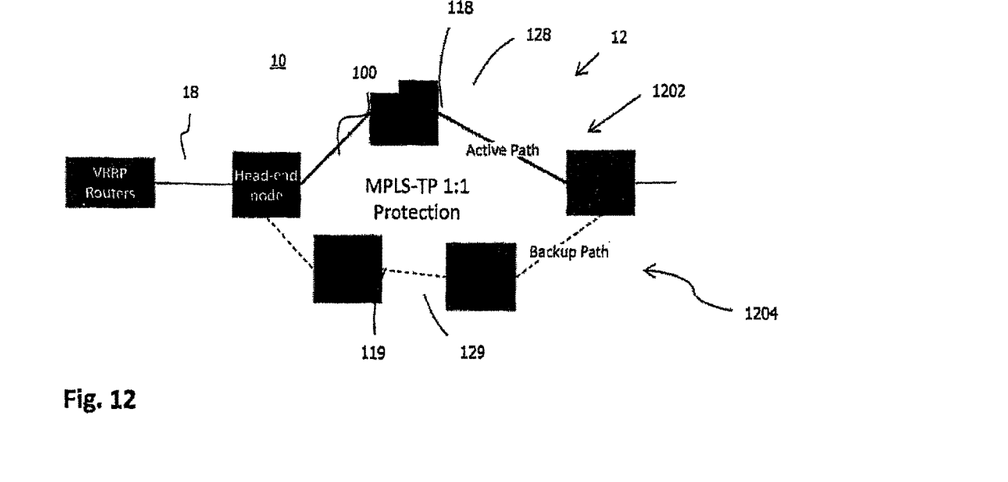
FIG. 12 schematically illustrates a third network environment including the device of FIG. 1.

The technique presented herein can be implemented, e.g., on the data link layer of any network providing a MAC learning mechanism and a redundancy mechanism. FIGS. 10 to 12 schematically illustrate applications of the technique in exemplary network environments 10.

The transport network 12 implemented in the exemplary network environment 10 includes an Ethernet Ring Protection (ERP) switching mechanism according to ITU-T Recommendation G.8032 to provide protection and recovery switching within 50 ms or less. The transport network 12 has a ring topology.

FIG. 11 schematically illustrates an exemplary network environment 10, wherein the transport network 12 implements Link Aggregation (LAG) combining multiple network links 107, 108 and 109 between the device 100 and the switch 127. The transport network 12 illustrated in FIG. 11 is an example for a device 100 not directly connected to the originating node 18.

FIG. 12 schematically illustrates an exemplary network environment 10, wherein the transport network 12 provides a Multiprotocol Label Switching (MPLS) Transport Profile protection mechanism including a primary path 1202 and a backup path 1204.

Figure 13:
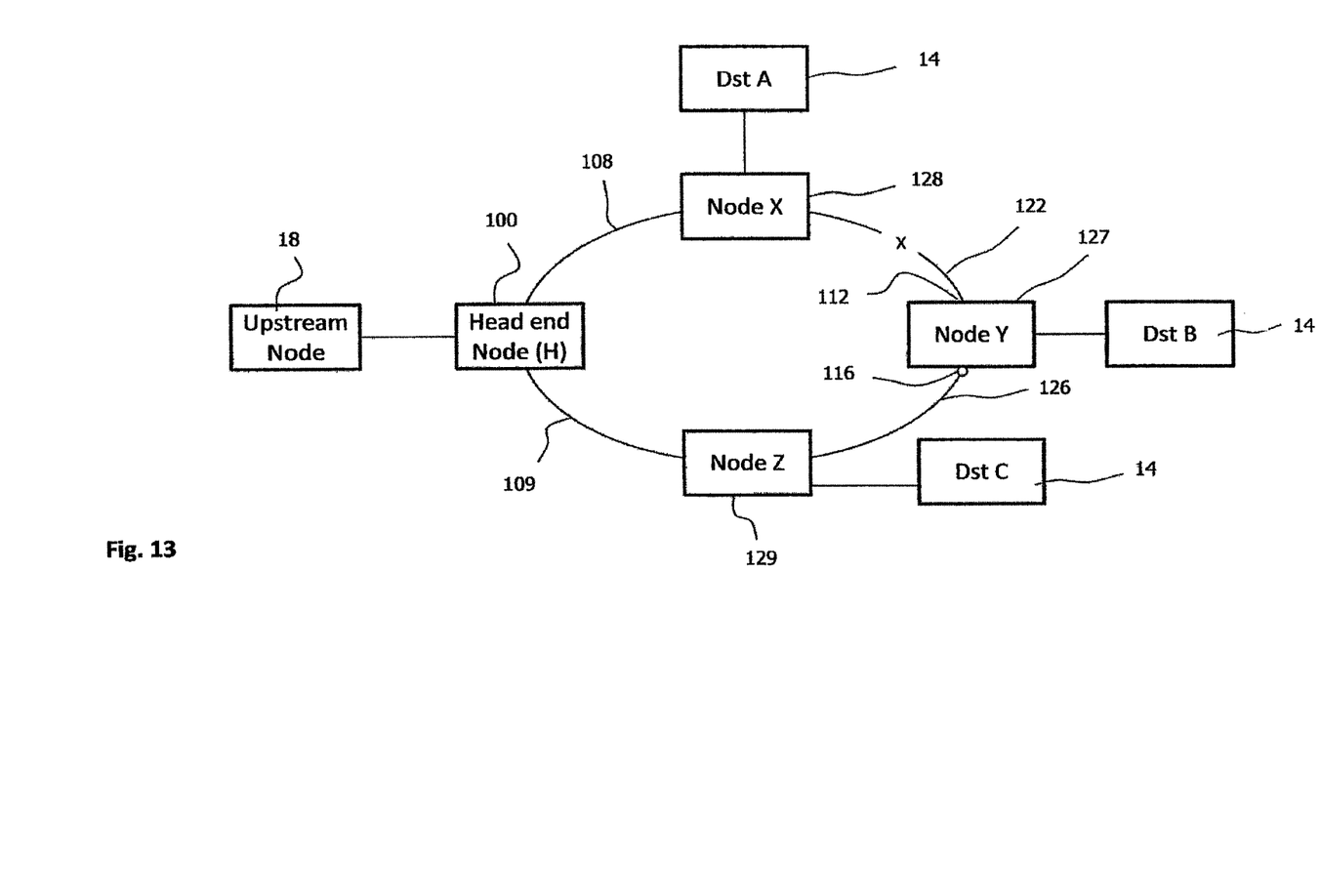
FIG. 13 schematically illustrates an exemplary operation of device of FIG. 1 according to the method of FIG. 2 in the network environment of FIG. 10.

The device 100 and the method 200 for triggering the association can trigger the association, depending on the implementation of the technique, in one, some or all of the nodes downstream of the device 100. FIG. 13 schematically illustrates the triggering effect of the device 100 and the method 200 in the exemplary ERP transport network 12 of FIG. 10. For clarity, the effect is explained only for the switch 127. The first switch port is implemented by the switch port 112 of the switch 127. The second switch port is implemented by the switch port 116 of the switch 127.

Before failure of the link 122, the backup link 126 is initially blocked, e.g., by including only the primary link 122 in the MAC address tables of the switches 127 and 128. The backup link 126 is not included in the MAC address table 304 of the switches 127 and 129. Consequently, data frames originating from the node 18 for destination A and destination B take the paths →H→X→A and →H→X→Y→B, respectively.

A failure (which is schematically indicated by "X" in FIG. 13) in the primary path is detected. In the exemplary situation illustrated in FIG. 13, the link 122 fails. The device 100 is not a direct end point of the link 122.

After the link failure, data frames for destination A and B take the paths →H→X→A and →H→Z→Y→B, respectively.

As has become apparent from above description of exemplary embodiments, the technique accelerates MAC relearning after MAC entry removal caused by, e.g., a link failure in at least some implementations. Service recovery can be accelerated and/or customer service interruption can be minimized in same or other implementations.

The technique is beneficially implemented in a network environment causing asymmetric data traffic via at least some network components. The technique can be implemented in one or more locations of a transport network providing a protection mechanism. The protection mechanism provided for the transport network may include, e.g., ERP, LAG, STP, MPLS-TP or a sub-combination thereof.

Traffic rerouting caused by a link failure, e.g., including service recovery and termination of data flooding, can be completed in less than 50 ms. Data traffic load caused by the link failure, e.g., due to flooding of data frames, can be reduced or even avoided in some embodiments of the technique.

For example, the time for MAC relearning can be independent of a periodicity at which data frames suitable for MAC learning are provided by an originating node. The data frame may be a VRRP data frame or any other data frame sent according to a virtualization mechanism.

Storing and resending may be limited to prioritized MAC addresses, so that memory resources and network load caused by the resending is minimized. Responsive to a link failure on a primary path of the transport network, the association between MAC address and switch port can readily be triggered for all prioritized MAC addresses, so that the prioritized services fulfill a preset Quality of Service requirement.

While the technique presented herein has been described in relation to exemplary embodiments, it is to be understood that this description is for illustrative purposes. Accordingly, the invention is limited only by the scope of the claims appended hereto.

The invention claimed is:

1. A method of triggering an association between a Media Access Control, MAC, address and a switch port, wherein the association allows forwarding data frames including the MAC address as destination MAC address via the associated switch port, the method comprising:
   receiving a data frame originating from an originating node, wherein the data frame includes a MAC address of the originating node as source MAC address;
   storing the data frame including the MAC address of the originating node;
   successfully sending the data frame towards a first switch port; and
   responsive to a failure of a first link towards the first switch port, resending the stored data frame towards a second switch port that is different from the first switch port for triggering an association between the second switch port and the MAC address of the originating node.

2. The method of claim 1, wherein the data frame including the MAC address of the originating node is periodically received from the originating node, wherein a duration between the periodic receptions is on the order of 1 second or more.

3. The method of claim 1, wherein storing the received data frame replaces a previously received data frame.

4. The method of claim 1, further comprising:
   forwarding second data frames received via the first switch port or the second switch port to the originating node, wherein a rate of the second data frames forwarded to the originating node is greater than a rate of received data frames originating from the originating node.

5. The method of claim 1, wherein at least one of the steps of forwarding, receiving, storing, sending and resending is performed by a triggering node located in a telecommunications network between the originating node and the first and second switch ports.

6. The method of claim 5, wherein the triggering node is closest to the originating node in a topology of a data link layer of the telecommunications network.

7. The method of claim 5, wherein the triggering node is a head-end node of an overlay network within the telecommunications network, wherein the triggering node connects the overlay network to the originating node.

8. The method of claim 7, wherein the overlay network includes a protection mechanism on the data link layer, wherein the protection mechanism includes the first switch port and second switch port.

9. The method of claim 5, wherein the step of resending further includes cancelling in a local MAC table of the triggering node one or more entries associated with a first local port coupled via the failed first link to the first switch port.

10. The method of claim 1, wherein the data frame is resent towards one or more second switch ports of one or more switches each including one of the second switch ports.

11. The method of claim 10, wherein the reception of the resent data frame at the one or more switches triggers storing the association between the corresponding one second switch port and the MAC address of the originating node at each of the one or more switches.

12. The method of claim 1, wherein the received data frame is selectively stored depending on one or more field values included in the data frame.

13. The method of claim 1, further comprising providing a list of MAC addresses, wherein stored data frames and/or data frames generated based on the stored data frames are resent in response to the failure of the first link, each of the resent data frames including one of the MAC addresses in the list as the source MAC address.

14. The method of claim 1, wherein the association allows forwarding data frames including the MAC address of the originating node as destination MAC address via the associated switch port in a first direction towards the originating node, and wherein sending and resending the data frame originating from the originating node relates to a second direction that is opposite to the first direction.

15. The method of claim 1, wherein the data frame is stored for a time after successfully sending the data frame.

16. The method of claim 1, wherein the data frame is stored in its entire length.

17. The method of claim 1, wherein the data frame originating from the originating node includes an Internet Group Management Protocol, IGMP, message, a Virtual Router Redundancy Protocol, VRRP, message and/or an Address Resolution Protocol, ARP, message.

18. The method of claim 1, wherein the originating node is a virtual router or a currently active router according to a Virtual Router Redundancy Protocol, VRRP.

19. A computer program product comprising a non-transitory computer readable storage medium storing program code for performing the steps of claim 1 when the program code is executed by a computing device.

20. A device for triggering an association between a Media Access Control, MAC, address and a switch port, wherein the association allows forwarding data frames including the MAC address as destination MAC address via the associated switch port, the device comprising:
   a processor; and
   a memory coupled to the processor and containing program code that is executed by the processor to:

receive a data frame originating from an originating node, wherein the data frame includes a MAC address of the originating node as source MAC address;

store the data frame including the MAC address of the originating node;

send the data frame towards a first switch port;

successfully send the data frame towards the first switch port; and responsive to a failure of a first link towards the first switch port, resend the stored data frame towards a second switch port that is different from the first switch port for triggering an association between the second switch port and the MAC address of the originating node.

* * * * *